United States Patent [19]

Zinchuk

[11] Patent Number: 4,555,731
[45] Date of Patent: Nov. 26, 1985

[54] ELECTRONIC IMAGING CAMERA WITH MICROCHANNEL PLATE

[75] Inventor: Michael Zinchuk, Hyannis, Mass.

[73] Assignee: Polaroid Corporation, Cambridge, Mass.

[21] Appl. No.: 605,188

[22] Filed: Apr. 30, 1984

[51] Int. Cl.$^4$ ............................................. H04N 5/30
[52] U.S. Cl. .................................. 358/209; 358/213; 358/211; 250/213 R
[58] Field of Search ............... 358/212, 213, 209, 211, 358/110; 357/24 LR; 250/578, 213 R, 330

[56] References Cited

U.S. PATENT DOCUMENTS

| | | | |
|---|---|---|---|
| 3,585,439 | 6/1971 | Schneeberger | 315/11 |
| 3,688,143 | 8/1972 | Lieb et al. | 313/67 |
| 3,922,576 | 11/1975 | Redman | 313/95 |
| 3,958,079 | 5/1976 | Case et al. | 178/6.8 |
| 4,015,115 | 3/1977 | Corcoran | 250/199 |
| 4,032,976 | 6/1977 | Levine | 358/213 |
| 4,120,002 | 10/1978 | Lieber | 358/111 |
| 4,176,275 | 11/1979 | Korn et al. | 250/213 |
| 4,178,528 | 12/1979 | Kennedy | 313/102 |
| 4,237,488 | 12/1980 | Takemura | 358/163 |
| 4,250,384 | 2/1981 | Pulvari | 250/330 |
| 4,253,120 | 2/1981 | Levine | 358/213 |
| 4,254,437 | 3/1981 | Funk et al. | 358/211 |
| 4,273,569 | 6/1981 | Gutierrez et al. | 148/171 |
| 4,338,627 | 7/1982 | Stapleton | 358/113 |
| 4,413,280 | 11/1983 | Alderstein et al. | 358/111 |
| 4,471,378 | 9/1984 | Ng | 358/110 |

Primary Examiner—Thomas W. Brown
Assistant Examiner—Robert G. Lev
Attorney, Agent, or Firm—Edward S. Roman

[57] ABSTRACT

Imaging apparatus for an electronic imaging camera responds to a scene image by converting photons into electrons representative of the scene image. A microchannel electron multiplier, including a microchannel plate, having an output surface at its output side is coupled to receive the electrons representative of the scene image and operates to intensify the electron representation of the scene image. A charge transfer device in the form of a charge coupled device (CCD), directly coupled to the output surface responds to the electron output to produce an electric signal representation of the scene image received by the camera. The electric signal representation is read out of the CCD by clock voltages and may have the form of a serial picture sample output. A signal processor may be provided to develop a video output from the sample output.

17 Claims, 4 Drawing Figures

ELECTRONIC IMAGING CAMERA WITH MICROCHANNEL PLATE

BACKGROUND OF THE INVENTION

1. Field of the Invention

This invention relates to an imaging apparatus for use in an electronic imaging camera and includes a charge transfer device such as charge coupled device (CCD) or the like. The invention is concerned more particularly with imaging apparatus which produce an electric signal representation of an image received by the camera. The electrical signal representation can be processed to provide a video output.

2. Prior Art

Of interest as pertinent general prior art are a number of U.S. Letters Patent identified as follows:

| U.S. Pat. No. | Inventor(s) | Issue Date |
|---|---|---|
| 3,585,439 | Robert J. Schneeberg | June 15, 1971 |
| 3,922,576 | Charles M. Redman | November 25, 1975 |
| 3,958,079 | Arthur L. Case et al. | May 18, 1976 |
| 4,015,115 | Donald G. Corcoran | March 29, 1977, and |
| 4,178,528 | Andrew J. Kennedy | December 11, 1979. |

It is known from U.S. Pat. No. 4,253,120 to Peter A. Levine issued Feb. 24, 1981 and entitled "Defect Detection Means for Charge Transfer Imagers" to position a charge coupled device (CCD) in the optical path of a low resolving power imaging optics which project an image on a light responsive surface of the CCD. The CCD is operatively associated with a source of clock voltages and responds to clock pulses therefrom to effect delivery of a serial picture sample output corresponding to the image projected on the surface of the CCD. The serial picture sample output is processed electronically by a signal processor to derive a video output. The imager as disclosed is of the frame or field type; CCD imagers of this type are known, for example, from U.S. Pat. No. 4,032,976 to Peter A. Levine, issued June 28, 1977 and entitled "Smear Reduction in CCD Imagers" which discloses in detail a CCD Imager including storage registers which can be associated with a clock voltages source suitable for reading out signals stored in the imager.

It is known from U.S. Pat. No. 4,338,627 to John J. Stapleton, issued July 6, 1982 and entitled "LED/CCD Multiplexer and Infrared Image Converter" to utilize a CCD sensor to develop a stored charge image of signals coupled to the CCD sensor from a light-emitting diode (LED) array, the signals from the array being coupled to the CCD via a bundle of optical fibers. At predetermined intervals, for example every six microseconds, the stored charges are shifted out of the CCD sensor and subsequently amplified and used for image reconstruction.

In recent years, microchannel electron multipliers have become known, the multipliers include microchannel plates to effect electron multiplying, these microchannel multipliers being particularly useful in image amplifiers. The microchannel plates are characterized by high electron gain, low noise, high spatial resolution, high speed, small weight and relatively low power consumption. As used in image intensifiers, the microchannel plate is usually associated with a photocathode upon which an optical image or the like to be intensified is projected. Electrons produced by the photocathode are used as input electrons to individual ones of the channels in the microchannel plate, these electrons in each individual multiplier channel are in effect amplified by generation of secondary electrons, the electron output from the plate being projected on a phosphor screen or the like to enable a user to view an intensity enhanced version of the image which was initially projected on the photocathode. An exemplary camera tube, utilizing a microchannel plate, is disclosed in the U.S. Pat. No. 4,120,002 to Albert J. Lieber issued Oct. 10, 1978 and entitled "Streak Camera Tube", the microchannel plate being associated with a photocathode and a phosphor screen. The screen is coupled to a fiber optic plate.

It is known from the U.S. Pat. No. 4,237,488 to Yasuo Takemura, granted Dec. 2, 1980 and entitled "Blemish Compensating System for a Solid State Image Pick-Up Device" to provide a solid state image pick-up device in the form of pick-up elements arranged to store electrical charges corresponding to an optical image formed on the light sensitive portions thereof, the pick-up elements being formed as part of a CCD pick-up device. Electronic circuitry is provided to energize a drive circuit which causes the CCD device to produce electrical signals corresponding to an optical image received via a color strip filter.

It has long been known from U.S. Pat. No. 3,688,143 to Albert Lieb et al., granted Aug. 29, 1972 and entitled "Multi-Diode Camera Tube with Fiber-Optics Faceplate and Channel Multiplier" to provide a camera tube which includes a microchannel plate used as an image intensifier in front of a photodiode array. Image light incident to the photocathode surface is converted into electrons, which are subsequently amplified by the microchannels of the plate. The output side of the microchannel plate is, as is conventional, a phosphor screen which converts the electrons produced in the microchannels back to visible light which is thereafter detected by a multidiode disk.

The camera tube of Lieb et al., supra, requires that electrons produced by the microchannels be converted to visible light which must be thereafter detected by the multidiode disk to produce an electrical signal output, a distinct disadvantage.

SUMMARY OF THE INVENTION

In one aspect, the present invention can be viewed as imaging apparatus for use in an electronic imaging camera which includes means responsive to an image received by the camera of the scene to be reproduced for converting photons into electrons representative of the scene image. At least one electron multiplier, which may be constituted by a microchannel electron multiplier having plate means is provided. The multiplier includes an output surface at its output side and is coupled to the converting means representative of the image. The multiplier provides an intensified electron representation of the image. A charge transfer device, which may be a charge coupled device (CCD), is coupled to the output surface and is directly responsive to its electron output for producing an electric signal representation of the image received by the camera.

In another aspect, the present invention can be seen as imaging apparatus for use in an electronic imaging camera which includes means responsive to an image of a scene received by the camera for converting photons into electrons representative of the scene image. Means including an output surface at its output side is coupled to the converting means and is responsive to electrons therefrom for intensifying the electron representation of the scene image. A charge transfer device, which may comprise a charge coupled device (CCD), is coupled to the output surface and is directly responsive to its electron output for producing an electrical signal representation of the scene image received by the camera.

The present invention can be viewed as being in an electronic imaging camera which includes instrumentalities responsive to an optically produced image of the scene to be reproduced for producing an electrical signal representation thereof. The improvement comprises means responsive to the scene image for producing electrons representative of the scene image. A microchannel electron multiplier, which may include plate means, responds to the electrons representative of the scene image and includes an output surface. A charge transfer device, which may comprise a charge coupled device (CCD) is coupled to the output surface and is directly responsive to electrons therefrom for developing the electric signal representative of the scene image received by the camera.

An object achieved by the present invention accordingly is to provide imaging apparatus for use with an electronic imaging camera which does not require an intensified electron representation to be converted into an optical image before transfer to a charge transfer device.

Another object achieved by the present invention is to provide imaging apparatus for use with an electronic imaging camera which does not require intermediate conversion of electrons representing an intensified electron representation of a scene image to photons before the energy is transferred to a charge transfer device.

An additional object achieved by the present invention is to provide an improved electronic imaging camera which obviates a need to provide a photodiode layer in a charge transfer device and effects direct charge transfer to individual capacitance pickup portions thereof.

An additional object achieved by the present invention is to provide an imaging camera which is simple, compact and reliable.

DETAILED DESCRIPTION OF THE PREFERRED EMBODIMENT

Figure 1:
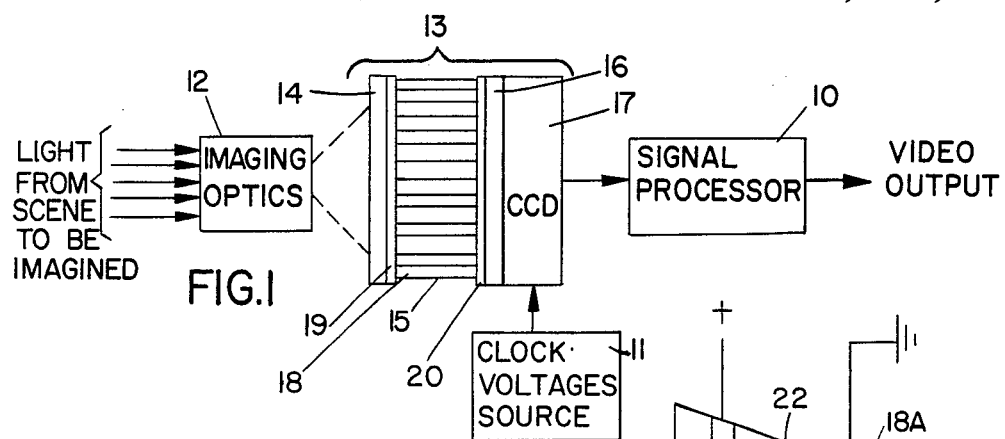
FIG. 1 is a diagrammatic illustration of an exemplary embodiment of an electronic imaging camera including the electronic imaging apparatus of the present invention.
Figure 2:
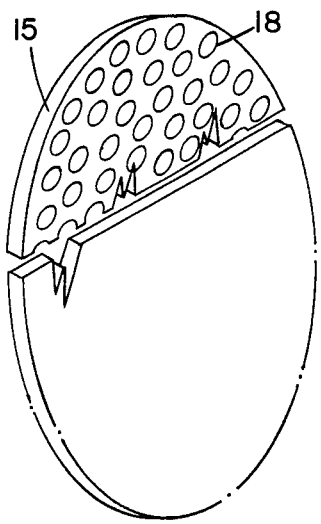
FIG. 2 is a simplified diagrammatic illustration of a microchannel plate which can be used as the electron multiplier shown in FIG. 1.
Figure 3:
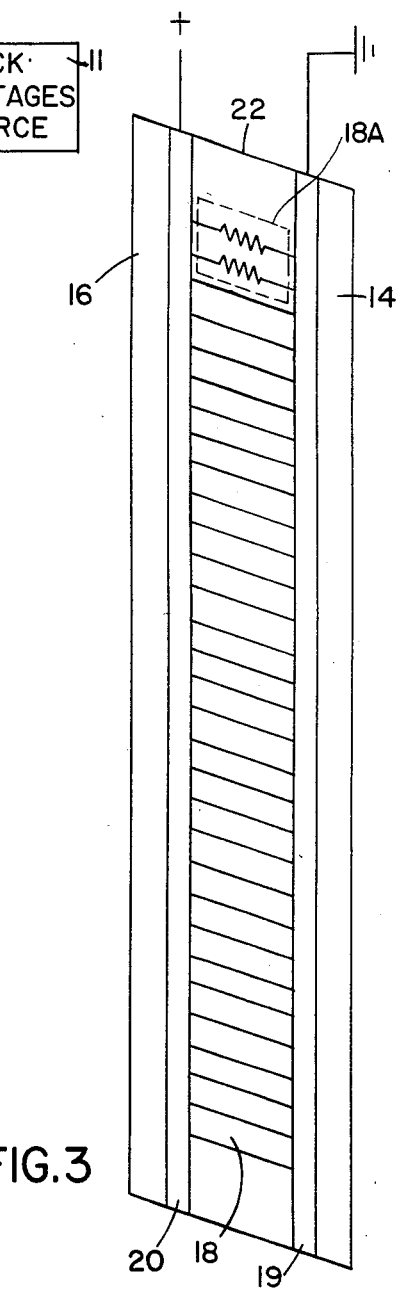
FIG. 3 is a diagrammatic illustration of a preferred microchannel electron multiplier, which can be used as the multiplier illustrated in FIG. 1.

Referring to FIGS. 1-3, an electronic imaging camera constructed in accordance with the present invention, is illustrated comprising an output signal processor 10 and a clock voltages source 11 which effect the transfer of signals which may constitute a serial picture sample output to the signal processor 10.

The imaging camera illustrated in FIG. 1, includes conventional imaging optics 12 positioned in front of a microchannel electron multiplier 13, so as to focus light from a scene to be imaged onto a phosphor screen 14, or another photocathode electron emitting member of the microchannel electron multiplier 13. The microchannel electron multiplier 13 includes a microchannel plate 15 constituted by a bundle of individual multiplier channels which determine or otherwise transfer electrons to an anode 16, which acts as an anode with respect to the electron source constituted by the phosphor screen 14. The anode 16, which may be of the same composition and construction as a conventional photocathode of a microchannel electron multiplier, is in direct contact with an electron receiving surface of a charge transfer device, illustrated as a charge coupled device (CCD) 17 so as to inject or transfer secondary electrons produced by the individual microchannels of the microchannel plate 15 into the individual capacitance sites in the charge coupled device 17, the transfer being effected via an electrode member constituted by the anode 16 which is operated at a voltage level considerably above the phosphor screen 14, consequently acting as an anode with respect to the phosphor screen 14, and as an electron transferring member with respect to the charge coupled device 17, the input surface of which is operated at a voltage above the bias voltage applied to the anode 16. As shown in FIG. 2, the microchannel plate 15 is a disk having a plurality of individual microchannels.

The electrode member 16, in one possible version of the electronic image camera of the present invention, can be constituted simply of the same structure which ordinarily would be used as a photocathode in a microchannel electron multiplier of conventional construction, as indicated above. In this case, it is clear that the orientation of the microchannel electron multiplier, with respect to the scene to be imaged, is reversed so that the member which would otherwise be a conventional output phosphor screen, acts as the photocathode, while that member which would otherwise be the photocathode operates as the output member of the microchannel electron multiplier and allows injection of electrons from the microchannel multiplier 13 directly into capacitance sites in the charge coupled device (CCD).

Microchannel plates are electron multiplying, vacuum electronic devices frequently used in image intensifier tubes for intensification of an optical image. In the present invention, a microchannel electron multiplier 13, which includes a microchannel plate 15 is used in the special orientation, as noted above, reversing the roles of the photocathode and phosphor screen.

Microchannel plates are characterized by high electron gain, low noise, high spatial resolution, high speed, small weight, relatively low power consumption, and long operational life.

Physically, a microchannel plate, such as the plate 15, is made of lead silicate glass and is a two dimensional array of hollow glass fibers 18 (FIGS. 2 and 3) fused together into a thin disk. The inside surface of the hollow glass fibers 18 is covered by a resistive secondary emission film diagrammatically shown at 18A in FIG. 3 which is electrically connected to an input plate 19 and the output plate 20, which may be respective thin electron-permeable nichrome electrodes of the microchannel plate 15. In some cases, the thin plates 19, 20 may be apertured, the apertures being aligned with the individual hollow glass fibers thereby allowing electrons from the phosphor screen 14 readily to pass into the hollow fibers 18 and the secondary electrons produced therein to exit the plate 15. The purpose of the plates 19, 20 apertured or not is to effect application of a positive, for example +650 volts, between the exit and entrance of the microchannels. It is to be understood that the respective phosphor screen 14 and the anode 16 can be designed to perform additionally the respective functions of the plates 19, 20, allowing these plates to be eliminated as separate components. The hollow glass fibers 18, forming the microchannels, have an inside diameter in the 8- to 45-um range, but may be even smaller depending on the resolution sought to be achieved. The channel length-to-diameter ratio (L/D) is typically on the order of 40 to 48 for conventional plates. Such plates are suitable for practicing the present invention. Of course, the smaller the diameter, the greater the resolution.

As shown in FIG. 3, the microchannels defined by hollow fibers 18 preferably are not perpendicular to the input and output surfaces but typically are positioned at a 5° to 10° bias angle, as illustrated in FIG. 3 by the fibers 18. The purpose of the bias angle is to assure a first electron impact near to the channel entrance, reduce ion feedback and improve the uniformity of image transmission. The input plate 19 and the output plate 20, as shown in FIG. 3, are insulated from one another and held in spaced relationship by a spacer ring 22 made, for example, of high strength glass. A potential of about +650 volts is applied between the plates 19 and 20.

OPERATION

The operation of the electronic imaging camera of FIG. 1 is described below, reference being made to FIG. 4 which illustrates a conventional charge transfer device (CCD), adapted for use in the camera of the present invention. Firstly, an image, which may change, is projected or focused onto the phosphor screen 14, the microchannel plate 15 receives electrons representing the optical image from the phosphor screen 14 and produces an intensified version thereof by virtue of the secondary electrons produced therein. These secondary electrons are coupled into the charge coupled device 17 causing individual capacitance sites therein constituting a first register to become charged.

Figure 4:
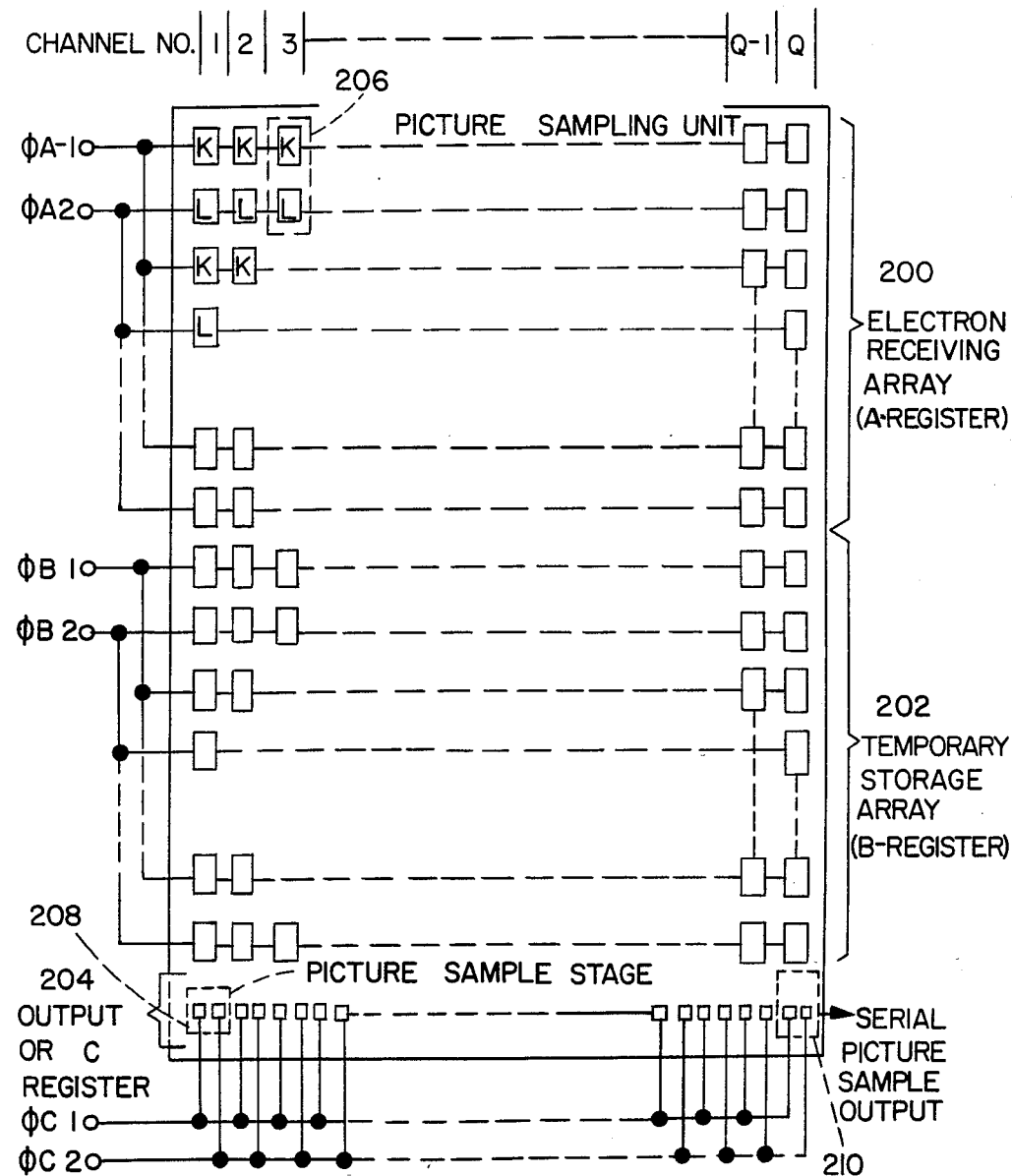
FIG. 4 is a schematic diagram of a CCD imager of the field transfer type which may be used for the CCD in the imaging apparatus shown in FIG. 1.

Referring to FIG. 4, it is assumed that the imager, which is formed in part by the charge coupled device (CCD) 17, is an imager of the field transfer type (sometimes termed an imager of the "frame" transfer type). Such CCD imagers are known in the art, and by way of example, are described in some detail in the above-mentioned U.S. Pat. No. 4,032,976 to Peter A. Levine. As shown in FIG. 4, such a two-phase CCD imager includes an array 200, designated as register A (constituting the above-mentioned first register), a temporary storage array 202, designated as register B, and an output register 204, designated as register C. The B and C registers are masked; that is, means are provided for preventing electrons injected into the A register from reaching either the B or the C register during injection.

The A and B registers are divided into separate channels, respectively numbers 1 . . . Q, each extending in the column direction. Extending in the column direction, between each pair of adjacent channels, is a channel stop provided for isolating charges in adjacent channels from each other. Each pair of adjacent electrodes K and L of each respective channel defines a discrete picture sampling element (shown as a dashed rectangle 206). The electrodes K and L, per discrete picture sampling element, constitute two-phase structures for ensuring unidirectional signal propagation in response to applied clock voltages from the source of clock voltages 11 (FIG. 1).

In particular, during the occurrence of each successive television field period, each picture sampling element 206 of array 200 accumulates a charge proportional to the electrons injected thereinto from the respective microchannels during that field period. At the end of each field period (during the vertical blanking interval, for example, of commercial television), the charge signals which have accumulated are transferred, in parallel, in the column direction from the A register to the B register by the application of the multiple phase clock voltages $\phi_{A1}$, $\phi_{A2}$, $\phi_{B1}$, $\phi_{B2}$. During the occurrence of the next field (in particular, during each successive horizontal line blanking interval of commercial television) clock phase voltages $\phi_{B1}$ and $\phi_{B2}$ are operated to transfer a line of picture samples at a time from the B register to the C register. (Dashed rectangular boxes 208 and 210 indicate stages of the C register, each of which stores a picture sample). During each successive television horizontal line time, the respective picture samples then stored in the C register are transferred sequentially out of the C register to form the serial picture sample output from the CCD 17 (FIG. 1). The transfer out of the C register usually occurs at the highest clock rate, namely, the clock rate of clock phase voltages $\phi_{C1}$ and $\phi_{C2}$, applied to the C register from the source of clock voltages 11 (FIG. 1). Therefore, normally the serial output of picture samples also occurs at this clock rate.

As the charges in the A register are transferred out, new electron charges are injected, these charges having amplitudes and patterns representing a new or changed image. As a result, the serial picture sample output from the charge coupled device 17 can represent a constantly changing image or several static images. The output can be recorded on tape, disks, cassettes or the like, can be fed to a computer or the like to be used or stored therein. The signal can be used for television viewing or broadcast. Indeed, the signal can be used to obtain a hard copy or other print of an image received by the imaging camera either directly or from storage.

It is to be appreciated that with appropriate filters and imaging optics, the electronic imaging camera herein described can be adapted to color picture production, for example, either for television video or hard copy formats. Three channels, one for each primary color, could be provided, the channels could use the same objective optics. Separate plural or one charge coupled device could be arranged to be coupled to one or another of three microchannel electron multipliers.

Alternatively, two channels could be utilized and the third color signal could be derived electronically from the two received colors as is well known in the art. Alternatively, a beam splitter could be stationed behind the imaging optics to divert a part of the image beam to a CCD array having a plurality of red, green and blue color stripes arranged in a well-known manner across the face thereof.

It is to be understood that the foregoing description and accompanying drawings relate to an exemplary embodiment of the present invention which has been sent out by way of example, not by way of limitation. It is to be appreciated that numerous other embodiments and variants are possible within the spirit and scope of the present invention, its scope being defined by the appended claims.

What is claimed is:

1. Image receiving and converting apparatus for use with an electronic imaging camera, said apparatus comprising means responsive to an image received by the camera of the scene to be reproduced for converting photons into electrons representative of the scene image, electron multiplier means, including an output surface at its output side, coupled to said converting means and responsive to the electrons therefrom representative of the scene image for intensifying the electron representation of the scene image, and a charge transfer device coupled to said output surface and directly responsive to its electron output for producing an electric signal representation of the image received by the camera.

2. The receiving and converting apparatus according to claim 1, including means coupled to said charge transfer device for reading out and receiving the electrical signal representation of the scene image received by the camera.

3. The receiving and converting apparatus according to claim 1, wherein said means for converting photons into electrons comprising a phosphor screen.

4. The receiving and converting apparatus according to claim 1, wherein said output surface is defined by a photocathode surface.

5. The receiving and converting apparatus according to claim 1 wherein said electron multiplier means comprises a microchannel multiplier.

6. In an electronic imaging camera which includes means for receiving and optically projecting an image of a scene to be reproduced, the improvement comprising means responsive to the projected scene image for producing electrons representative of the scene image, a microchannel multiplier responsive to the electrons representative of the scene image and including an output surface, and a charge transfer device coupled to said output surface and directly responsive to electrons therefrom for developing an electrical signal representation of the scene image.

7. The improved camera according to claim 6 wherein said means for producing an electron representation of the scene image comprises a phosphor screen.

8. The improved camera according to claim 6 wherein said output surface is defined by a photocathode surface.

9. The improved camera according to claim 6 including means coupled to said charge transfer device for reading out and receiving the electrical signal representation of the scene image received by the camera.

10. In an electronic imaging camera which includes means for receiving and optically projecting an image of a scene to be reproduced, the improvement comprising means responsive to the scene image for producing an electron representation of the scene image, means including an output surface at its output side and responsive to the electron representation of the scene image for producing an intensified electron representation of the scene image, and means coupled to said output surface and directly responsive to electrons therefrom for developing an electrical signal representation of the scene image received by the camera.

11. An improved camera according to claim 10, wherein said means coupled to said output surface comprises a charge transfer device.

12. The improved camera according to claim 11, including means coupled to said charge transfer device for reading out and receiving the electrical signal representation of the scene image received by the camera.

13. The improved camera according to claim 10, wherein said means for producing an electron representation of the scene image comprises a phosphor screen.

14. The improved camera according to claim 10, wherein said output surface is defined by a photocathode surface.

15. Image receiving and converting apparatus for use in an electronic imaging camera, said device comprising means for producing an intensified electron representation of a scene image received by the camera on an output surface thereof, and a charge transfer device directly coupled to said output surface and responsive to electrons therefrom for developing an electric signal representation of the scene image received by the camera.

16. The device of claim 15 wherein said means for producing an intensified electron representation comprises a microchannel multiplier.

17. The device of claim 15 wherein said output surface is defined by a photocathode surface.

* * * * *